United States Patent
Johannsen et al.

(10) Patent No.: US 12,233,969 B2
(45) Date of Patent: Feb. 25, 2025

(54) CENTER TREAD IDLER IN GROUND-ENGAGING TRACK SYSTEM DIMENSIONED TO FORM A SPROCKETED IDLER WEAR PATTERN

(71) Applicant: Caterpillar Inc., Peoria, IL (US)

(72) Inventors: Eric J Johannsen, Washington, IL (US); David Jennings Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 767 days.

(21) Appl. No.: 17/372,120

(22) Filed: Jul. 9, 2021

(65) Prior Publication Data
US 2023/0018696 A1 Jan. 19, 2023

(51) Int. Cl.
*B62D 55/15* (2006.01)
*B62D 55/20* (2006.01)

(52) U.S. Cl.
CPC ........... *B62D 55/15* (2013.01); *B62D 55/20* (2013.01)

(58) Field of Classification Search
CPC ... B62D 55/12; B62D 55/14–15; B62D 55/20
See application file for complete search history.

(56) References Cited

U.S. PATENT DOCUMENTS

| | | | |
|---|---|---|---|
| 3,113,805 A * | 12/1963 | Nodwell | B62D 55/24 305/180 |
| 3,567,294 A | 3/1971 | Simpson et al. | |
| 4,034,618 A | 7/1977 | Groff et al. | |
| 6,033,043 A | 3/2000 | Higuchi et al. | |
| 6,250,726 B1 | 6/2001 | Burdick et al. | |
| 6,601,664 B2 | 8/2003 | Hiraki et al. | |
| 6,648,784 B2 | 11/2003 | Redmond | |
| 7,823,990 B2 | 11/2010 | Agnot | |
| 9,216,782 B2 * | 12/2015 | Kunigk | B62D 55/26 |
| 10,227,099 B2 | 3/2019 | Johannsen | |
| 11,679,825 B2 * | 6/2023 | Suanno | B60B 3/087 305/136 |
| 2012/0193978 A1 | 8/2012 | Diekevers et al. | |
| 2014/0091615 A1 | 4/2014 | Knobloch | |
| 2018/0099708 A1 | 4/2018 | Johannsen | |
| 2019/0233031 A1 * | 8/2019 | Wang | B62D 55/14 |
| 2020/0140025 A1 * | 5/2020 | Jones | B62D 55/145 |

FOREIGN PATENT DOCUMENTS

JP 2020125041 A * 8/2020 ............ B60B 19/12

* cited by examiner

*Primary Examiner* — Jason R Bellinger

(57) ABSTRACT

A ground-engaging track system includes a center tread idler having an inner surface defining an idler axis of rotation, and an outer tread surface. The ground-engaging track system further includes a track contacted by the idler between parallel track chains and defining a track pitch dimension. The outer tread surface defines an outer diameter dimension, and a ratio of the track pitch dimension to the outer diameter dimension is between 28% and 37%. The outer diameter dimension may be one of the outer diameters of Table 1. The idler and track contact during service at fixed bushing-idler contact locations so as to bias wearing away material of the idler to form pockets imparting a sprocketed configuration to the idler during service.

17 Claims, 3 Drawing Sheets

CENTER TREAD IDLER IN GROUND-ENGAGING TRACK SYSTEM DIMENSIONED TO FORM A SPROCKETED IDLER WEAR PATTERN

TECHNICAL FIELD

The present disclosure relates generally to an idler in a ground-engaging track system, and more particularly to an idler dimensioned to form a sprocketed wear pattern during service.

BACKGROUND

A wide variety off-highway machines utilize tracks for propulsion of the machine upon a ground substrate. In a typical arrangement a plurality of track links are coupled together to form track chains in an endless loop about a plurality of rotatable track contacting elements. Track rollers are mounted to a track roller frame and support much of the weight of the machine while a drive sprocket engages the track and advances the same. An idler is typically positioned to passively rotate in contact with the track to assist in support and guiding. Idlers are commonly smooth-surfaced and cylindrical. Other designs employ a toothed or sprocketed idler.

Designs are known where the idler contacts track rails formed by the track links. Another common configuration employs a center tread idler that contacts bushings upon track pins that connect the track links together. In virtually all track system configurations mitigating and managing wear of track system material during service is important to optimizing service life. Thus, there are virtually innumerable strategies for not only limiting wear of components but in many instances biasing wear of components to occur at certain locations or in certain patterns. One known track system including a center tread idler having wear management features is set forth in United States Patent Application Publication No. 2012/0193978.

SUMMARY

In one aspect, a center tread idler includes an idler body having an inner surface defining an idler axis of rotation, and an outer tread surface extending circumferentially around the idler axis of rotation and positioned at a uniform distance from the idler axis of rotation. The outer tread surface defines an outer diameter dimension as in Table 1, plus or minus a tolerance that is from 0.1% to 0.5% of the outer diameter dimension.

In another aspect, a ground-engaging track system includes a track having a plurality of track links coupled end-to-end by way of track pins to form two parallel track chains, and bushings upon each of the track pins. The track system further includes a center tread idler having an inner surface defining an idler axis of rotation, and an outer tread surface extending circumferentially around the idler axis of rotation and positioned at a uniform distance from the idler axis of rotation. Each of the bushings defines a bushing diameter dimension, the track defines a track pitch dimension, and the outer tread surface of the idler defines an outer diameter dimension. A sum of the bushing diameter dimension and the outer diameter dimension is an integer or a half-integer multiple of the track pitch dimension.

In still another aspect, a center tread idler includes an idler body having an inner surface forming a cylindrical idler bore and defining an idler axis of rotation extending between a first idler axial side and a second idler axial side, a first guide wing upon the first idler axial side, and a second guide wing upon the second idler axial side. The center tread idler further includes an outer tread surface extending circumferentially around the idler axis of rotation and defining an outer diameter dimension as in Table 1.

DETAILED DESCRIPTION

Figure 1:
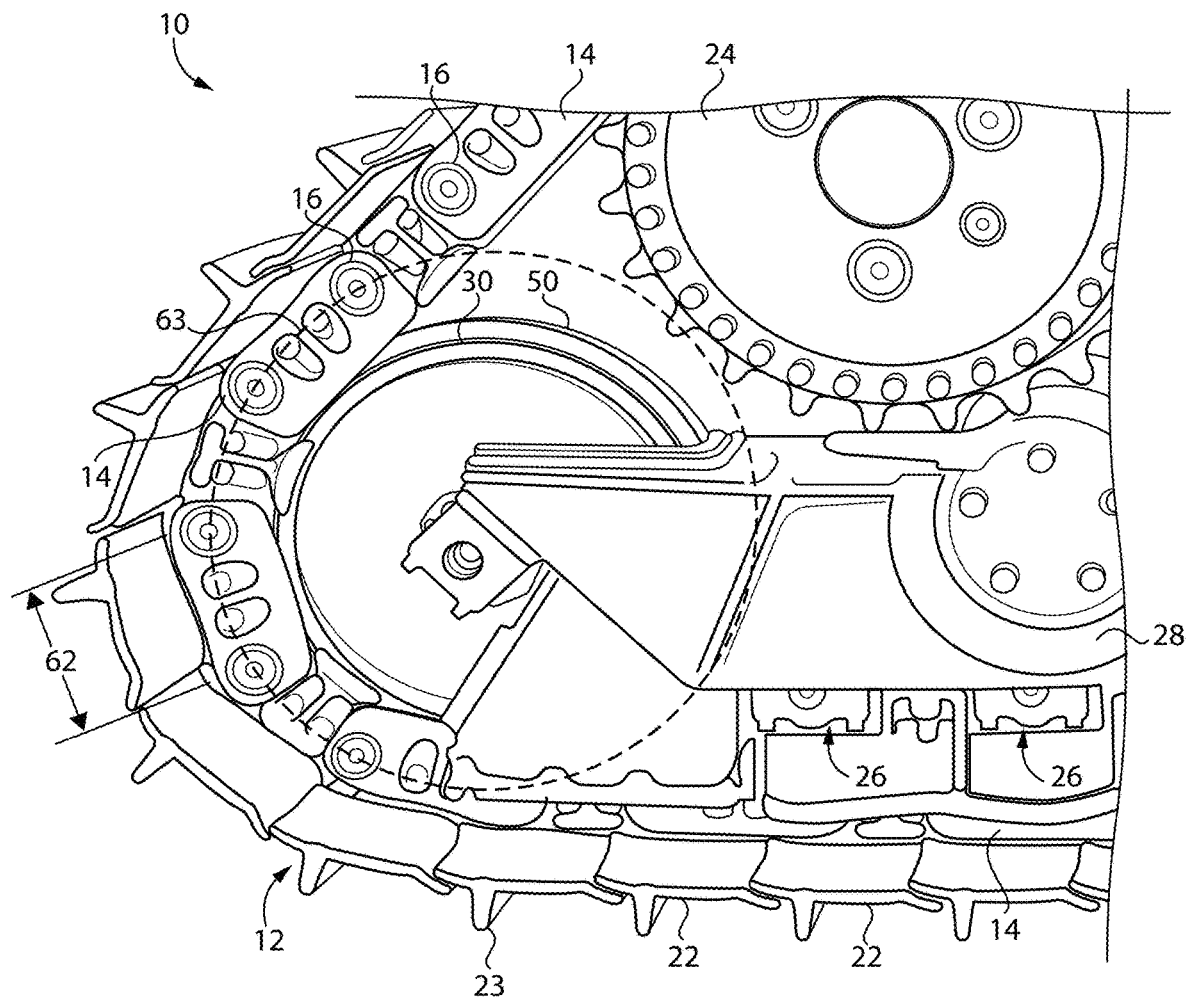
FIG. 1 is a side diagrammatic view of a ground-engaging track system, according to one embodiment.

Referring to FIG. 1, there is shown a ground-engaging track system 10, according to one embodiment. Ground-engaging track system 10 (hereinafter "track system 10") can be implemented in a variety of off-highway machines, such as a track-type tractor, a track-type loader, a mining machine, an excavator, a half-track machine, or various others. Ground-engaging track system 10 includes a track 12 having a plurality of track links 14 coupled end-to-end by way of track pins 16. Track 12 also includes track shoes 22 attached to track links 14 and each equipped with a grouser 23 in the illustrated embodiment. Track system 10 also includes a drive sprocket 24 configured in the illustrated embodiment in a so-called "high drive" arrangement. In other embodiments track system 10 could have an oval configuration, or still another.

Track system 10 further includes a center tread idler 30, and a plurality of track rollers 26. Track rollers 26 and center tread idler 30 are mounted to a track roller frame 28. It can been seen from FIG. 1 that drive sprocket 24 has a toothed configuration, with teeth and pockets (not numbered) in an alternating arrangement to enable engagement with track 12 for advancing track 12 about the various rotatable track contacting elements. Center tread idler 30 has a smooth and cylindrical outer profile. It is desirable in various ground-engaging track applications to utilize a sprocketed idler. As will be further apparent from the following description, track system 10 is uniquely configured to enable center tread idler 30 to wear in such a way that material is displaced from center tread idler 30 to impart a "sprocketed" configuration, ultimately forming pockets in center tread idler 30 that can maintain and enhance track performance as track system 10 progresses through its field service life.

Figure 2:
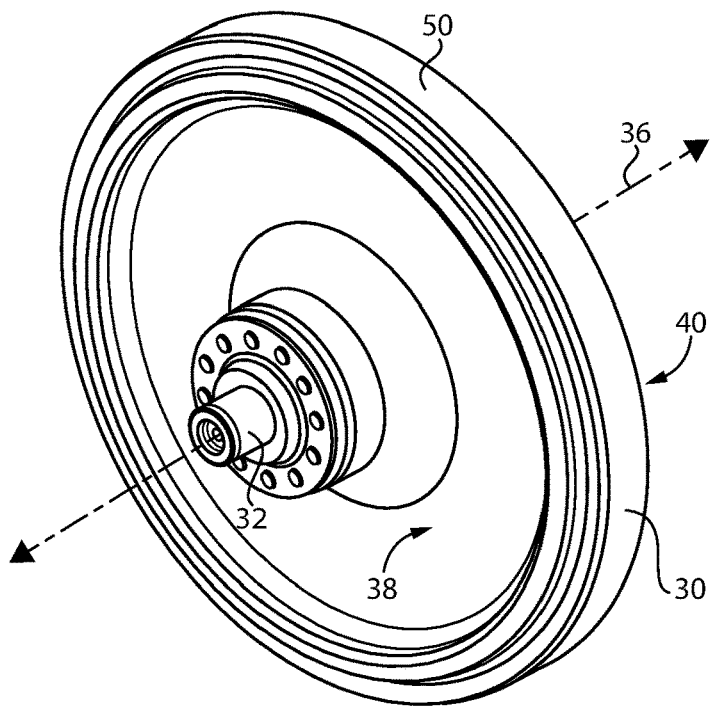
FIG. 2 is an isometric view of an idler for a ground-engaging track system, according to one embodiment.
Figure 3:
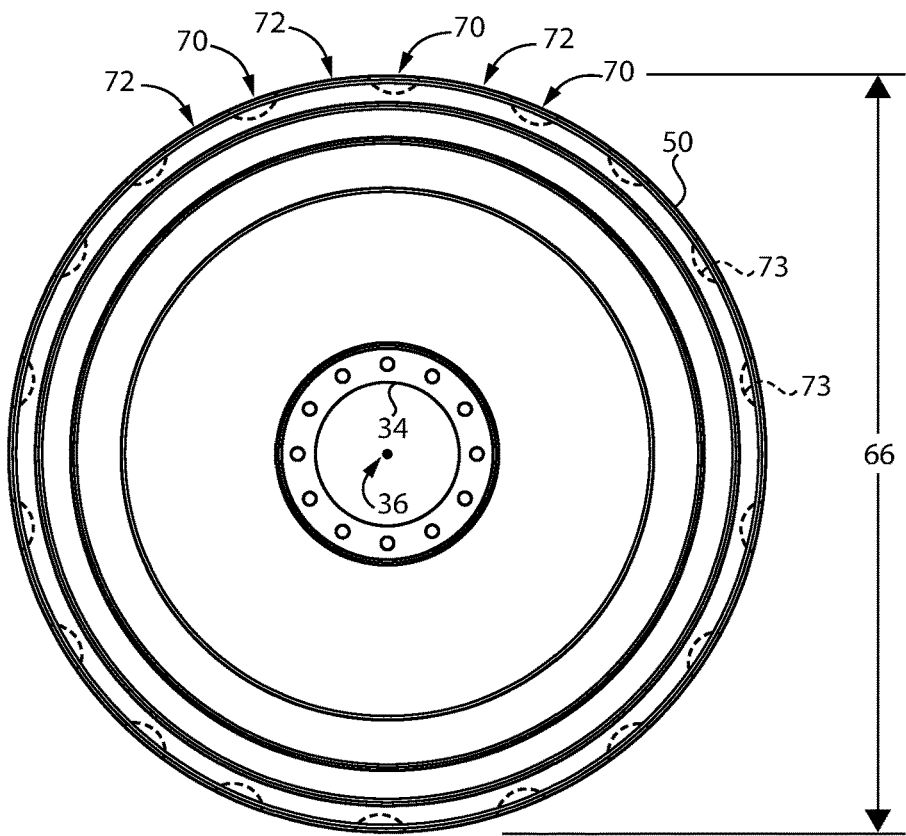
FIG. 3 is a side view of an idler for a ground-engaging track system, according to one embodiment.
Figure 4:
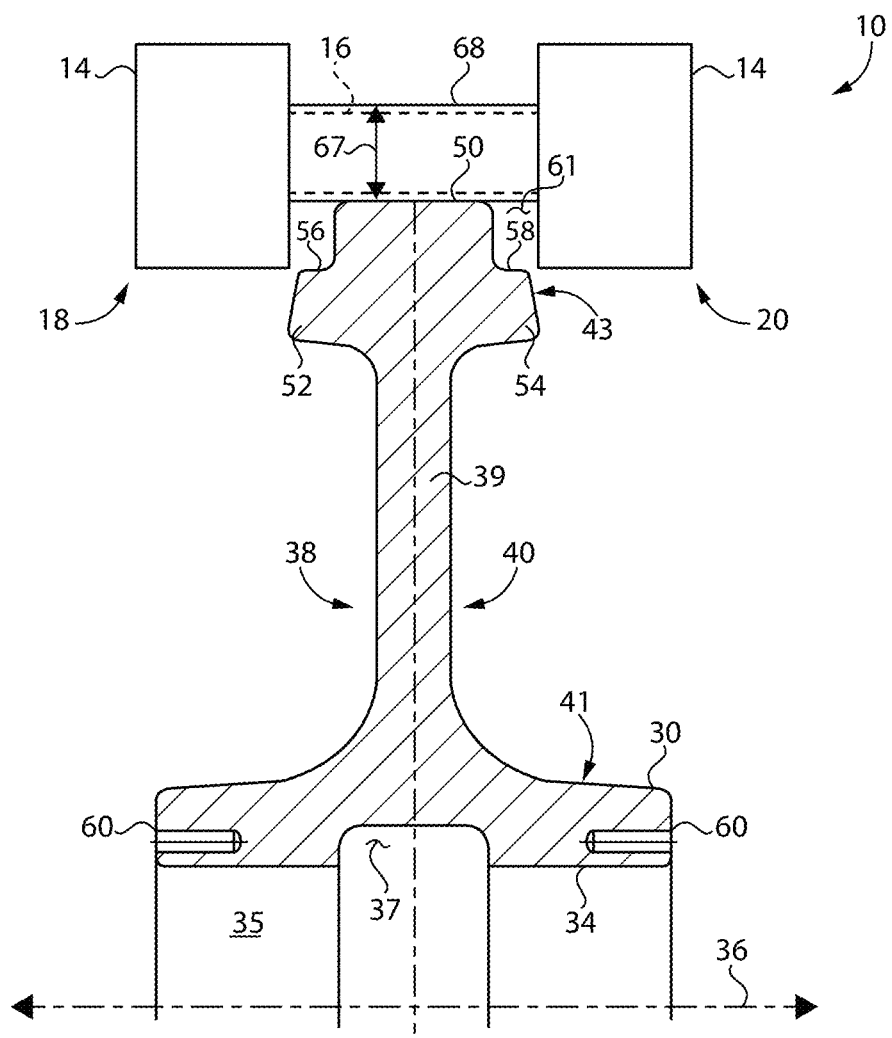
FIG. 4 is a partially sectioned view through a portion of a ground-engaging track system, according to one embodiment.

Referring also now to FIGS. 2-4, center tread idler 30 (hereinafter "idler 30") includes an inner surface 34 defining an idler axis of rotation 36 and forming a cylindrical idler bore 35. An idler shaft 32 extends through idler bore 35 and rotatably journals and supports idler 30 along with conventionally arranged sleeve bearings or roller bearings, thrust bearings, lubrication features, seals, and other known apparatus. A centrally located inner cavity 37 extends circumferentially around idler axis of rotation 36 and is in communication with idler bore 35. Idler axis of rotation 36 and idler bore 35 extend between a first idler axial side 38 and a second idler axial side 40 of idler 30. Idler 30 may further include a center body 41 having idler bore 35 formed therein, and a narrowed web portion 39 extending between center body 41 and an outer rim portion 43. In an implementation, idler 30 includes a first guide wing 52 upon first idler axial side 38 and a second guide wing 54 upon second idler axial side 40. Each of first guide wing 52 and second guide wing 54 may extend circumferentially around idler axis of rotation 36. Each of first guide wing 52 and second guide wing 54 may be fully circumferential of idler axis of rotation 36, although the present disclosure is not thereby limited and partial-circumference guide wings, projecting lugs, or other features might be used. Guide wings could be omitted in still other embodiments.

Idler 30 further includes an outer tread surface 50 extending circumferentially around idler axis of rotation 36. A first step 56 may be formed between outer tread surface 50 and first guide wing 52, and a second step 58 may be formed between outer tread surface 50 and second guide wing 54. First guide wing 52 and second guide wing 54 may have an angular orientation relative to idler axis of rotation 36, and may include conical outer surfaces, in some embodiments. Bores 60 may be formed in center body 41 of idler 30 for receiving bolts clamping components to idler 30 and within idler bore 35. During service, track 12 may be laterally guided during advancing track 12 about idler 50, drive sprocket 24, and track rollers 26 in track system 10 by way of contact between idler 50 and inside surfaces of track links 40 within a track guiding space 61, as depicted in FIG. 4. Guide wings 52 and 54 can assist in orienting track 12 relative to idler 30 particularly as track 12 is coming into or going out of engagement with idler 30. It can further be seen from FIG. 4 that track links 14 are arranged to form two parallel track chains 18 and 20. Track 12 may further include bushings 68 upon track pins 16, with outer tread surface 50 being in contact with some of bushings 68 at any given time during service. Bushings 68 may be non-rotating bushings upon track pins 16 in a practical implementation strategy.

Track 12 further defines a track pitch (TP) dimension 62. TP dimension 62 is defined by a track pin axis to track pin axis linear distance in track 12, and is typically uniform throughout track 12. Outer tread surface 50 of idler 30 is positioned at a uniform distance from idler axis of rotation 36 and has a cylindrical shape when first placed in surface. Outer tread surface 50 defines an outer diameter (OD) dimension 66, and bushing 68 defines a bushing diameter (BD) dimension 67. In FIG. 1 there can be seen a dashed circle 63, the diameter of which is a so-called track pitch diameter. The track pitch diameter 63 may be understood as a theoretical circle centered on idler axis of rotation 36 and intersecting center axes of track pins 16. It has been discovered that by configuring idler 30 with an appropriate OD dimension 66 and bushings 68 with an appropriate BD dimension 67, idler 30 and track 12 interact with one another according to a consistent contact pattern. In particular, a sum of BD dimension 67 and OD dimension 66 is an integer or a half-integer multiple of TP dimension to impart the desired consistent pattern of contact.

As a result, track 12 contacts outer tread surface 50 at fixed bushing-idler contact locations 70 upon outer tread surface 50 during advancing track 12 about the several rotatable track contacting elements. Fixed contact locations 70 are spaced in an alternating arrangement circumferentially around idler axis of rotation 36 with fixed passive (non-contact) locations 72 upon outer tread surface 50. This means that track 12 will contact outer tread surface 50 at the same locations regardless of what section of track 12 contacts idler 30. The present disclosure exploits this discovery by wearing away material based on the contacting of the track 12 to idler 30 to form a plurality of pockets 73 at the fixed contact locations 70, the pockets 73 to be formed being shown illustratively in phantom lines in FIG. 3.

An actual idler diameter (OD dimension 66) to be used in a given track system according to the present disclosure can be calculated based on the track pitch diameter 63 minus BD diameter 67. Accordingly, with relatively larger diameter bushings, OD dimension 66 might be made relatively less, and with smaller diameter bushings OD dimension 66 might be made relatively larger, for a given track pitch diameter. To produce idler 30 a one-piece idler body may be formed, for example, by forging, then machined to final dimensioning consistent with the relative and actual sizes disclosed herein.

The relationship between OD dimension 66 and TP dimension 62 can also be expressed as a ratio in certain instances. A ratio of TP dimension 62 to OD dimension 64 may be between 28% and 37%. In an implementation, OD dimension 66 is one of the OD dimensions in the following Table 1, and TP dimension 62 is one of the TP dimensions in Table 1.

TABLE 1

| | Number of track pitches in full wrap | | | | | |
|---|---|---|---|---|---|---|
| Pitch | 9.5 | 10 | 10.5 | 11 | 11.5 | 12 |
| 171.5 mm | OD = 463 mm | OD = 490 mm | OD = 517 mm | OD = 544 mm | OD = 571 mm | OD = 598 mm |
| 190 mm | OD = 515 mm | OD = 545 mm | OD = 575 mm | OD = 604 mm | OD = 634 mm | OD = 664 mm |
| 202.8 mm | OD = 550 mm | OD = 581 mm | OD = 613 mm | OD = 645 mm | OD = 677 mm | OD = 709 mm |
| 215.9 mm | OD = 585 mm | OD = 619 mm | OD = 652 mm | OD = 686 mm | OD = 720 mm | OD = 754 mm |
| 228.6 mm | OD = 619 mm | OD = 655 mm | OD = 691 mm | OD = 726 mm | OD = 762 mm | OD = 798 mm |
| 240 mm | OD = 649 mm | OD = 687 mm | OD = 724 mm | OD = 762 mm | OD = 800 mm | OD = 837 mm |
| 260.35 mm | OD = 707 mm | OD = 748 mm | OD = 788 mm | OD = 829 mm | OD = 870 mm | OD = 911 mm |
| 280 mm | OD = 762 mm | OD = 806 mm | OD = 850 mm | OD = 894 mm | OD = 938 mm | OD = 982 mm |
| 317.5 mm | OD = 868 mm | OD = 917 mm | OD = 967 mm | OD = 1017 mm | OD = 1067 mm | OD = 1117 mm |

Also in a practical implementation strategy, OD dimension 66 may be one of the OD dimensions as in Table 1, plus or minus a first tolerance, and TP dimension 62 may be one of the TP dimensions in Table 1, plus or minus a second tolerance. The first tolerance will typically be greater than the second tolerance, and in a refinement the first tolerance may be about 40 times greater than the second tolerance. The first tolerance may be from 0.1% to 0.5% of the OD dimension in any given idler. An example of the first tolerance is plus or minus 2 millimeters, and an example of the second tolerance is plus or minus 0.05 millimeters.

Track system 10 may further be characterized by a relationship between a full wrap number of track pitches of track 12 circumferentially around outer tread surface 50. The full wrap number can be thought of as the number of track pitches that equal an outer circumference dimension of idler 30. The full wrap number of track pitches is equal to the number of links in one track chain fully wrapped around the idler, if such an arrangement were produced. As also depicted in Table 1, a full wrap number of track pitches around outer tread surface 50 may be an integer or half-integer from 9.5 to 12.

INDUSTRIAL APPLICABILITY

During service, track 12 is advanced around idler 30, drive sprocket 24, and track rollers 26, to propel a machine upon a substrate. As noted above track 12 is contacted during the advancement with outer tread surface 50 at fixed contact locations 70. When first placed in service idler 30 will be uniformly cylindrical around outer tread surface 50. The contact between bushing 68, or potentially bare track pins 16, with outer tread surface 50 will tend to include some sliding contact that wears away a relatively tiny amount of material from outer tread surface 50 each time the contact occurs.

Over time, the wear will produce pockets 73 that cause bushings 68 to migrate modestly inward into idler 30, eventually reaching a state where bushings 68 rest within pockets to engage idler 30. The present disclosure is considered to provide improved performance in many instances, including where wear of track links and other components allows track system 10 to experience increased play between and among components, such that enhanced guiding and control of track path will become available as the sprocketed pattern of wear in idler 30 develops.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A center tread idler comprising:
an idler body including an inner surface defining an idler axis of rotation, and an outer tread surface extending circumferentially around the idler axis of rotation and positioned at a uniform distance from the idler axis of rotation; and
the outer tread surface defining an outer diameter (OD) dimension, and the OD dimension is equal to one of the listed OD dimensions as in Table 1, plus or minus a tolerance that is from 0.1% to 0.5% of the outer diameter OD dimension,
wherein the idler body further includes a first guide wing upon a first axial side of the idler body and a second guide wing upon a second axial side of the idler body,
wherein each of the first guide wing and the second guide wing includes a conical outer surface.

2. The center tread idler of claim 1 wherein the tolerance is plus or minus 2 millimeters.

3. The center tread idler of claim 1 wherein the inner surface forms a cylindrical idler bore, and the idler body further includes a centrally located inner cavity extending circumferentially around the idler axis of rotation and in communication with the idler bore.

4. The center tread idler of claim 3 further including an idler shaft extending through the cylindrical idler bore between a first axial side of the idler body and a second axial side of the idler body.

5. The center tread idler of claim 1 wherein each of the first guide wing and the second guide wing is fully circumferential of the idler axis of rotation.

6. The center tread idler of claim 1 wherein a first step is formed between the outer tread surface and the first guide wing, and a second step is formed between the outer tread surface and the second guide wing.

7. A ground-engaging track system comprising:
a track including a plurality of track links coupled end-to-end by way of track pins to form two parallel track chains, and bushings upon each of the track pins;
a center tread idler including an inner surface defining an idler axis of rotation, and an outer tread surface extending circumferentially around the idler axis of rotation and positioned at a uniform distance from the idler axis of rotation;
each of the bushings defining a bushing diameter dimension, the track defining a track pitch dimension, and the outer tread surface of the idler defining an outer diameter dimension; and
a sum of the bushing diameter dimension and the outer diameter dimension is an integer or a half-integer multiple of the track pitch dimension.

8. The track system of claim 7 wherein a ratio of the track pitch dimension to the outer diameter dimension is between 28% and 37%.

9. The track system of claim 8 wherein:
the outer diameter dimension is equal to one of the listed outer diameter (OD) dimensions in Table 1, plus or minus a first tolerance;
the track pitch dimension is equal to one of the listed track pitch (TP) dimensions in Table 1, plus or minus a second tolerance; and
the first tolerance is greater than the second tolerance.

10. The track system of claim 9 wherein the first tolerance is plus or minus 2 millimeters, and the second tolerance is plus or minus 0.05 millimeters.

11. The track system of claim 7 wherein a full wrap number of track pitches of the track circumferentially around the outer tread surface is an integer or half-integer from 9.5 to 12.

12. The track system of claim 7 wherein the center tread idler and the track together define a plurality of fixed bushing-idler contact locations spaced circumferentially around the outer tread surface.

13. The track system of claim 7 wherein the center tread idler includes a first guide wing upon a first idler axial side and a second guide wing upon a second idler axial side each extending circumferentially around the idler axis of rotation.

14. A center tread idler comprising:
an idler body including an inner surface forming a cylindrical idler bore and defining an idler axis of rotation extending between a first idler axial side and a second idler axial side;
a first guide wing upon the first idler axial side;
a second guide wing upon the second idler axial side;
an outer tread surface extending circumferentially around the idler axis of rotation and including a plurality of fixed bushing-contact locations alternating circumferentially around the idler axis of rotation with a plurality of fixed non-contact locations; and the outer tread surface defining a plurality of pockets at each respective one of the plurality of fixed bushing-contact locations, and defining an outer diameter (OD) dimension at each of the plurality of fixed non-contact locations equal to one of the OD dimensions listed as in Table 1.

15. The center tread idler of claim 14 wherein the first guide wing includes a conical outer surface and the second guide wing includes a conical outer surface.

16. The center tread idler of claim 14 wherein the outer diameter dimension is one of the outer diameter dimensions as in Table 1 plus or minus a tolerance that is from 0.1% to 0.5% of the outer diameter dimension.

17. The center tread idler of claim 16 wherein the tolerance is plus or minus millimeters.

* * * * *